United States Patent [19]

Anderson et al.

[11] Patent Number: 5,021,163

[45] Date of Patent: Jun. 4, 1991

[54] CATALYTIC DESTRUCTION OF SULFUR-OXYGEN ANIONS

[75] Inventors: Ernest R. Anderson; Dominick Vacco, both of Rochester; Thomas J. Dagon, Pittsford, all of N.Y.

[73] Assignee: Eastman Kodak Company, Rochester, N.Y.

[21] Appl. No.: 559,106

[22] Filed: Jul. 25, 1990

[51] Int. Cl.$^5$ ............................ C02F 1/42; C02F 1/70
[52] U.S. Cl. .................................... 210/661; 210/668; 210/670; 210/679; 210/683; 210/743; 210/757
[58] Field of Search ............... 210/668, 670, 679, 683, 210/743, 757, 661

[56] References Cited

U.S. PATENT DOCUMENTS

| | | | |
|---|---|---|---|
| 3,173,862 | 3/1965 | Clements et al. | 210/661 |
| 3,817,862 | 6/1974 | Hoke | 210/63 |
| 4,292,293 | 9/1981 | Johnson et al. | 423/571 |
| 4,569,769 | 2/1986 | Walton et al. | 210/759 |
| 4,582,690 | 4/1986 | Rempel et al. | 423/36 |

OTHER PUBLICATIONS

"Ion-Exchange Sorption of Thiosulfate and Tetrathionate on Protonated Poly(4-Vinyl Pyridine)," M. Chanda et al., *Reactive Polymers*, 1984, pp. 269-278.

"In-Situ Precipitation as the Regeneration Step in Ion Exchange for Silver Recovery," P. R. Quinones, *SMPTE Journal*, Sep. 1984, pp. 800-807 and p. 803.

"Ion Exchange Polymers," R. L. Albright and P. A. Yarnell, *Encyclopedia of Polymer Science and Engineering*, 2nd. Ed., 1987, vol. 8, John Wiley and Sons, Inc., New York, New York, p. 373.

*Primary Examiner*—Ivars Cintins
*Attorney, Agent, or Firm*—L. George Legg

[57] ABSTRACT

Anions containing sulfur and oxygen, e.g. thiosulfate, can be catalytically reduced using a protonated anion ion exchange resin as a catalyst. The process is preferably conducted in an aqueous system and at a pH below about 8.

17 Claims, 6 Drawing Sheets

CATALYTIC DESTRUCTION OF SULFUR-OXYGEN ANIONS

FIELD OF THE INVENTION

The instant invention relates to waste water treatment and, in particular, to a method of destroying a sulfur oxyanion having sulfur in a valence state of from +2 to +6 in photoprocessing solutions and process waste solutions.

BACKGROUND OF THE INVENTION

Several manufacturing processes, for example, photochemical processes and photoprocessing, paper manufacturing, petroleum refining, flue gas desulfurization, the production of inorganic chemicals, and canning processes, generate waste waters containing undesirable high concentrations of sulfur oxyanions. By sulfur oxyanions is meant water-soluble, inorganic sulfur-oxygen anions such as thiosulfate ($S_2O_3{}^{2-}$), tetrathionate ($S_4O_6{}^{2-}$) and trithionate ($S_3O_6{}^{2-}$) and the like. Sulfur oxyanions exhibit a chemical oxidation demand (COD) and a biological oxygen demand (BOD), parameters that are subject to environmental regulation discharge limits. Environmental regulations also limit the discharge of silver, which is contained in the waste water generated from some of the above said manufacturing processes and, most notably, from photoprocessing or industrial processes involving the use or manufacture of photochemicals. Consequently, further treatment of waste water to lower the silver content and to destroy the inorganic sulfur oxyanions is necessary.

RELATED ART

Copper compounds have been proposed as catalysts for the removal of thiosulfate by oxidation. U.S. Pat. No. 4,569,769, Walton et al assigned to Interox America, discloses the use of a water soluble copper catalyst to improve the oxidation of thiosulfate with hydrogen peroxide. It was found that the copper catalyst improved the rate and extent of thiosulfate oxidation and lowered the amount of hydrogen peroxide necessary for oxidation, while also lowering the quantity of acid necessary to neutralize the aqueous alkaline discharge. This process, however, suffers the cost disadvantage of requiring the reactant hydrogen peroxide and the further disadvantage that it involves two separate processes, aeration of sulfur oxyanions in the waste solution and then treatment with hydrogen peroxide.

U.S. Pat. No. 4,582,690, Rempel et al assigned to the University of Waterloo, discloses the use of sulfur-bonded copper as a catalyst in the oxidation of thiosalts, which include salts of thiosulfate, tetrathionate and trithionate. Although Rempel discloses that the rate and amount of thiosalt oxidation increase in the presence of the catalyst, large amounts of acid are required to maintain the reaction rate. A further disadvantage is that the catalytic effect of sulfur-bonded copper on the thiosulfate oxidation rate greatly decreases and becomes economically ineffective at high concentrations of thiosulfate on the order of about 50 g/L or higher.

Iron compounds have also been proposed as catalysts for the removal by oxidation of water soluble sulfide compounds. U.S. Pat. No. 4,292,293, Johnson et al assigned to Nalco Chemical Company, discloses the use of polyionic additives in the presence of iron catalysts to promote oxidation of water soluble sulfide compounds wherein the oxidizing agent is oxygen, hydrogen peroxide or chlorine. This process can require as chemical reactants hydrogen peroxide, chlorine or oxygen and the like, and it may thus be desirable to utilize a process not requiring a constant infusion of such reactants.

Heretofore, the use of protonated anion ion exchange resins has been studied, for their possible use in solving the above discussed problems associated with the prior art methods, with respect to lowering the sulfur oxyanion concentration in an aqueous solution by means of an ion exchange process. This proposal was disclosed in "Ion-Exchange Sorption of Thiosulfate and Tetrathionate on Protonated Poly(4-Vinyl Pyridine)", M. Chanda et al, *Reactive Polymers*, 1984, pp. 269–278 ("Chanda"). Chanda conducted experiments with two such resins on the sorption of thiosulfate ions and tetrathionate ions from aqueous solutions. Chanda's disclosed method included agitating the solution with the resin but did not include maintaining the pH while conducting the disclosed procedure. A disadvantage of this method is that the resin does not remain effective in removing sulfur oxyanions from the waste solution because it becomes spent as its ion exchange capacity is approached. A further disadvantage is that the sulfur ions remain on the resin and must then be further removed by elution, or other means to reprocess the resin or otherwise permanently remove the sulfur ions from the waste solution to lower the COD and BOD. Another disadvantage is that the disclosed method is ineffective in treating waste solutions such as photoprocessing solutions that contain relatively high concentrations of sulfur oxyanions. Yet another disadvantage is that the prior art method can necessitate lengthy reaction times and thus involve associated high process costs.

In addition to the above stated problems with sulfur oxyanion-containing waste solutions, environmental discharge limits also limit the amount of silver in waste streams. Heretofore, silver recovery or removal processes using ion exchange resins suffered the disadvantage of reduced effectiveness when sulfur oxyanions and particularly thiosulfate are also present with the silver. See, for example, "In-Situ Preparation as the Regeneration Step in Ion Exchange for Silver Recovery," P. R. Quinones, *SMPTE Journal*, September 1984, pp. 800–807. It is, therefore, preferable to reduce thiosulfate concentration to facilitate silver removal or recovery in addition to attaining the above stated discharge limits on COD and BOD.

This invention solves the prior art problems noted above. It is not limited to low-concentration solutions of sulfur oxyanions. Also, the instant invention can be carried out faster and with fewer chemical reactants than required by the prior art and result in reduced process costs. The invention also eliminates the costly and time-consuming step or steps of elution and removal of the process by-products necessitated by some of the prior art methods above noted. The invention, furthermore, is effectively carried out concurrently or in association with silver removal from process solutions, an important requirement in treating photoprocessing solutions to meet environmental discharge limits. Thus, by means of this invention, there is provided an improved method of destroying a sulfur oxyanion, having sulfur in a valence state of from +2 to +6, in an aqueous solution containing inert cations, that solves the above-stated prior art problems.

SUMMARY OF THE INVENTION

The invention provides a method of destroying a sulfur oxyanion having sulfur in a valence state of from +2 to +6 in an aqueous solution containing inert cations by efficiently contacting a catalytic quantity of a protonated anion ion exchange resin with the aqueous solution while maintaining the pH of the aqueous solution below about 8. The sulfur oxyanion is thereby destroyed by reduction to elemental sulfur.

In a preferred embodiment, the method is conducted by suspending the resin in the solution by introducing a stream of a motive gas into the suspension, whereby the resin is efficiently contacted with the aqueous solution to destroy the sulfur oxyanion.

Another preferred method of the invention is to maintain the pH by adding sulfuric acid to the aqueous solution, and in another preferred method the pH is maintained at less than about 3.

A preferred anion ion exchange resin for the method of the invention is one selected from the group consisting of (i) polyvinyl pyridine, (ii) phenol formaldehyde polymeric resins having the repeating unit wherein m has a value from 2 to about 4, and (iii) resins having the formula

P—X—P wherein P is a polymeric unit selected from the class consisting of epoxy, acrylic, and styrene, and X is a linking group selected from the class consisting of wherein R is a straight chain alkyl group having from 2 up to about 8 carbon atoms, wherein T is a straight chain alkyl group having from 2 up to about 8 carbon atoms, and and having at least one basic group attached to said polymeric unit P, said basic group being selected from groups having the formula and wherein z has a value of 0 or 1 and m has a value from 0 to about 3, q has a value from 1 to about 3, and when z has a value of 1, n has a value from 2 to about 7, and when z has a value of 0, n has a value from 1 to about 7. The resin is protonated by contact with an acid for use in the method of the invention.

The invention is useful in treating waste streams, and particularly useful in treating photoprocessing solutions, containing a high concentration of sulfur oxyanion with or without silver ion present, and the treated solution can thereby be treated to be within environmentally acceptable discharge sulfur oxyanion limits and within allowable limits of COD and BOD.

DESCRIPTION OF PREFERRED EMBODIMENTS

A preferred embodiment of the present invention is a method for the destruction of a sulfur oxyanion in an aqueous solution containing inert cations, said sulfur oxyanion having sulfur in a valence state of from +2 to +6, said method comprising efficiently contacting a catalytic quantity of a protonated anion ion exchange resin with said aqueous solution containing said sulfur oxyanion while maintaining the pH of said solution at a pH below about 8, whereby said sulfur oxyanion is reduced to elemental sulfur.

Sulfur oxyanion-containing compounds are typically present in photoprocessing solutions and other waste solutions and can contain sulfur oxyanions such as thiosulfate, tetrathionate, and trithionate and the like.

A particularly preferred method of the invention is wherein the catalytic quantity of protonated ion exchange resin is selected from the group consisting of (i) polyvinyl pyridine, (ii) phenol formaldehyde polymeric resins having the repeating unit wherein m has a value from 2 to about 4, and (iii) resins having the formula

P—X—P wherein P is a polymeric unit selected from the class consisting of epoxy, acrylic, and styrene, and X is a linking group selected from the class consisting of wherein R is a straight chain alkyl group having from 2 up to about 8 carbon atoms, wherein T is a straight chain alkyl group having from 2 up to about 8 carbon atoms, and and having at least one basic group attached to said polymeric unit P, said basic group being selected from groups having the formula and wherein z has a value of 0 or 1, m has a value from 0 to about 3, q has a value from 1 to about 3, and when z has a value of 1, n has a value from 2 to about 7, and when z has a value of 0, n has a value from 1 to about 7.

In another preferred embodiment the resin is suspended in the aqueous solution to promote efficient contacting of the resin with the solution, and a preferred method of creating and maintaining such suspension comprises introducing a stream of motive gas into such suspension. Good flow characteristics of the solution through the resin are thereby created, for example by minimizing channeling effects, and the resin is thereby efficiently contacted with the solution. This is especially important as the process time of the invention increases, that is, as the method proceeds to completion, as otherwise reaction intermediates and end products may build up on the resin and decrease the contacting efficiency of the resin with the solution.

The resin of the invention can be any anion ion exchange resin such as are commercially available, for example, under such trade names as Amberlite IRA-68, Amberlite IRA-458, IRA-45, Rohm and Haas Co., and PVP or poly(4-vinyl pyridine), Reilly Tar and Chemical Corporation. Preferred resins are those selected from the group consisting of polyvinyl pyridine, phenol formaldehyde polymeric resins having the repeating unit wherein m has a value from 2 to about 4, and resins having the formula

P—X—P wherein P is a polymeric unit selected from the class consisting of epoxy, acrylic, and styrene, and X is a linking group selected from the class consisting of wherein R is a straight chain alkyl group having from 2 up to about 8 carbon atoms, wherein T is a straight chain alkyl group having from 2 up to about 8 carbon atoms, and and having at least one basic group attached to said polymeric unit P, said basic group being selected from groups having the formula wherein z has a value of 0 or 1 and m has a value from 0 to about 3, q has a value of from 1 to about 3, and when z has a value of 1 n has a value from 2 to about 7, and when z has a value of 0 n has a value from 1 to about 7, with said aqueous solution containing said sulfur oxyanion while maintaining the pH of said solution at a pH below about 8, whereby said sulfur oxyanion is reduced to elemental sulfur.

Methacrylic and chloromethylacrylic monomers copolymerized with acrylic monomers can also be employed in the method of the invention. Generally, any ion exchange resin having a polymeric backbone of styrene, acrylic or styrene-acrylic and having anion functionality can be used. The resins used in the practice of the invention can be either the gel type, or the macroreticular/macroporous type of resin that has a rougher, more porous catalytic and ion exchange surface than the gel type. A particularly preferred resin of the invention is that sold under the trade name Amberlite IRA-68, Rohm and Haas Co., which is a weakly basic anion ion exchange resin having an acrylic backbone, crosslinked with divinyl benzene, having a tertiary amine functional group which is dimethyl amino propyl amine, and being a gel-type microporous resin. In another preferred embodiment the anionic ion exchange resin contains a metal ion. A preferred such metal ion is one selected from the group consisting of copper, molybdenum, cobalt, iron, magnesium, silver, and mixtures thereof. Particularly preferred is a silver ion, for example in the form of silver sulfide imbibed in such resin. By "imbibed" is meant that the silver sulfide is absorbed into and physically contained by the resin. A preferred weight proportion of silver to resin is from about 10 percent to about 20 percent, and particularly preferred is such weight proportion from about 12 percent to about 16 percent.

The ion exchange resins of the invention preferably are in bead form and preferably are manufactured by suspension polymerization, a process that is well known to those skilled in the art of resin manufacture and is described, for example, at *Encyclopedia of Polymer Science and Engineering*, 2d Ed., 1987, Vol. 8, "Ion Exchange Polymers", R. L. Albright and P. A. Yarnell, pp. 342-347, John Wiley and Sons, Inc., New York, N.Y., incorporated herein by reference. Representative resins are described therein as are resins of the invention with structural formulae.

Any of the above resins selected for use in the invention must be protonated by contacting the resin with a mineral acid. A preferred such mineral acid is sulfuric acid. In a preferred embodiment protonation of the resin is carried out by adding a 5 weight percent solution of sulfuric acid with an equal volume of resin. The resin and acid can be tumble mixed and the resin allowed to settle. The acid can then be decanted and the resin rinsed with water. The resin is then filtered from the solution and air dried. The reaction conditions for protonation can be readily selected by one of ordinary skill in the art. For example, the amount of time for mixing the resin and acid can be so determined. A preferred such time is at least about 2 hours. The number of times the resin is rinsed with water is likewise within the skill of one skilled in the art to determine. A preferred such number of rinses is about three. A preferred drying temperature is from about 65° F. (18.3° C.) to about 75° F. (23.9° C.).

The crosslinker component of the resins of the invention should comprise a molecular ratio from about 4 to about 12 percent with respect to the repeating monomeric units of the resin. Generally, the higher the proportion of crosslinker employed the more microporous the resin. The basic group that is the functional group attached to the polymeric backbone of the resin should comprise a molecular ratio from about 80 to about 96 percent with respect to the repeating monomeric units of the resin.

The pH of the aqueous solution must be maintained at a level below about 8 in the practice of the invention. In a preferred embodiment the pH is maintained at less than about 6, and particularly preferred is maintaining the pH at below about 3. In another preferred embodiment, the pH is maintained by automatic chemical addition means responsive to a fluctuation of the pH outside of a predetermined operating range whereby a chemical is automatically added to the aqueous solution to return the pH to the predetermined operating range. The solution or waste water may be treated by any suitable acid, such as sulfuric acid, to maintain the desired pH. The method can be carried out for a time sufficient to lower the COD and BOD to within the applicable and relevant environmental discharge limits the determination of which time is well within the skill of one of ordinary skill in the art. The amount and flow rate of the motive gas can vary the selection of which is well within the skill of one of ordinary skill in the art. Likewise, it is within the skill of one of ordinary skill in the art to select a location of entry of motive gas into the container containing resin and solution. In a preferred embodiment, the gas is introduced near the bottom of such container in order to effectuate upflow of the gas through a substantial amount of the solution. In such preferred embodiment the amount and flow rate of motive gas may be readily selected as above stated to effectuate as a particularly preferred embodiment maintaining the resin in suspension in the solution. Other means well known in the art for suspending a solid suspended in a solution may also be employed in the method of the invention. The invention can be practiced with a reactive gas as the motive gas, such as air, and it can also be practiced with an inert gas, such as nitrogen.

A preferred aqueous solution is a photoprocessing solution, and particularly preferred is a photoprocessing fix solution or a bleach-fix solution containing thiosulfate. A preferred such bleach-fix solution is one containing ammonium thiosulfate, sodium bisulfite, and an ammonium salt of the ferric complex of ethylenediaminetetraacetic acid. A preferred photoprocessing fix solution containing thiosulfate is one containing ammonium thiosulfate or one containing a thiosulfate compound with another compound or compounds, such as a mixture of ammonium thiosulfate and sodium bisulfite.

The invention may be carried out in a batch process or in a continuous process, as described, for example, at *Encyclopedia of Chemical Technology*, 3d Ed., 1981, Vol. 13, "Ion Exchange", R. M. Wheaton and L. J. Lefevre, pp. 690-693. The typical configuration shown therein, however, is downflow of the solution through the resin, whereas in a preferred embodiment of the method of the invention as above described the resin is suspended in the aqueous solution; said suspension is difficult to maintain with a downflow of solution through the resin and is therefore not preferred with such embodiment.

When practicing the invention in the continuous mode, in a preferred mode the resin is placed in a glass column to which the sulfur oxyanion-containing solution is introduced in an upward flow. A preferred embodiment to contain the resin in the column is to place hollow plastic spheres in the upper part of the column. The spheres should have a diameter larger than the column discharge opening so that they are retained in the column. It is within the skill of the operator to select a sphere size that allows adequate solution flow through the column while containing the resin. The solution also may contain a suspended solid having particles of a diameter less than that of the resin beads. In such embodiment, the solution containing suspended solid can flow past the spheres that are retaining the resin if the particle diameter is selected to allow such flow, the selection of which is within the skill of one of ordinary skill in the art. System parameters such as solution flow rate, motive gas flow rate, and column size, sphere size, and particle size can be readily selected by the operator to optimize system performance. Thus, for example, when treating a photoprocessing solution containing thiosulfate, using a six inch glass column having a volume of about 26.3 liters, and with about five kilograms of IRA-68 resin having resin bead diameter of about 0.43 mm and density of about 1.06 g/ml, about 965 hollow plastic spheres having about a 0.75 inch greater diameter are effective to contain the resin while allowing the solution to flow through the resin.

The invention may be practiced with any aqueous solution containing a sulfur oxyanion. For example, the invention is effective with an aqueous solution having a concentration of sulfur oxyanion of less than about 5 grams per liter. In a preferred embodiment, the concentration of sulfur oxyanion in the aqueous solution is from about 5 to about 100 grams per liter. Particularly preferred is a concentration of sulfur oxyanion in the aqueous solution of at least 50 grams per liter. The invention is also effective when silver ion is additionally present in the aqueous solution.

In the method of the invention the sulfur oxyanion comprises sulfur in a valence state of from $+2$ to $+6$. The sulfur oxyanion can comprise multivalent sulfur, for example $S_5O_6$, wherein the sulfur atoms comprise different valences in the above stated range.

The resins of the invention are organic and it is desirable to maintain their effectiveness in the practice of the invention. Accordingly, the aqueous solution should contain inert cations so as not to react with and break down the resin. By "inert cations" is meant cations that are substantially unreactive with the resins of the invention. Trace amounts of cations or other compounds that are reactive with the resin may be acceptable if they do not significantly affect the resin's operability as a catalyst. It is well within the skill of one of ordinary skill in the art to determine the acceptable levels of such contaminants or reactive agents. In a preferred embodiment the sulfur oxyanion-containing compound is an inorganic salt. Also, the solution containing the sulfur oxyanion should be aqueous and not organic so to not react with and break down the resin.

The amount of resin to be used in carrying out the method of the invention can be selected depending on such factors as the amount of solution to be processed, the concentration of sulfur oxyanion in the solution, the particular embodiment of the invention being used, for example fluidized bed, and the like.

The resin catalyst can be periodically regenerated to recover or maintain its efficiency as a catalyst as used in the processes heretofore described. Regeneration processes are well known in the art and are also described in manufacturers' product technical literature. When used as a catalyst as described in the present invention, it may be necessary to regenerate the resin by contacting the resin with an acid despite the resin manufacturer recommending contact with a base for other processes, for example resin regeneration after ion exchange applications.

A preferred method of regenerating the resin catalyst is to introduce it to a sulfuric acid solution. A preferred such sulfuric acid concentration is 5 percent by weight. In a preferred embodiment, the sulfuric acid solution containing the resin is stirred. The solution is then decanted off, water is added, the container shaker, and the solutions decanted off, a step that can be repeated a number of times as is within the skill of one of ordinary skill in the art to determine. This may be done at regular, periodic intervals, such as after a predetermined time of practicing the present invention in either a continuous or batch process, the selection of which intervals is well within the skill of a person having ordinary skill in the art to determine.

The anionic ion exchange resin catalyst may imbibe a metal ion in salt form such as silver sulfide as heretofore described. The catalyst with silver sulfide imbibed may not require regeneration as soon as the catalyst without silver sulfide. As stated above, the invention may be practiced on waste streams such as photoprocessing waste solutions that contain silver ion in solution in addition to sulfur oxyanion. The use of a non-silver sulfide laden resin catalyst can then result in the resin imbibing silver sulfide and thereby removing silver from solution. Although the resin containing silver sulfide may become less effective for silver removal recovery as the silver sulfide content increases, the resin can be effective in destroying sulfur oxyanions and therefore continue to be used as described hereinabove.

The reaction time for the method of the invention is not a truly independent variable and is dependent at least to some extent on factors such as the amount of resin present, the amount of aqueous solution, the concentration and kind of sulfur oxyanion present, and the embodiment of the invention selected. Thus, the time of reaction is not critical so long as it is sufficient for reaction to take place. In general, a reaction time of 1 hour to 6 hours should suffice, but a reaction time can be readily determined by a skilled practitioner using known techniques.

Reaction products and gases resulting from the practice of the present invention include sulfur dioxide. A preferred additional step is to remove the sulfur dioxide by passing the gases through a basic solution, and most preferably aqueous sodium hydroxide.

While any suitable process temperature can be employed, a temperature in the range of about 55° C. to 70° C. is preferred. Particularly preferred is a process temperature of 55° C. to 58° C.

The invention is further illustrated by the following examples of its practice.

Aqueous solutions of ammonium thiosulfate of selected concentrations were prepared in conducting the tests hereinafter described. The tests were carried out in batch as described hereinabove, and as follows. A solution of ammonium thiosulfate, photographic bleach-fix solution, or seasoned x-ray fix, as indicated below for each example, was placed in a closed round bottom flask reaction vessel. Reaction temperature was maintained by placing the reaction vessel in a constant temperature water bath using an Omega 2000 temperature controller.

For testing with resin, resin was charged into the vessel and the vessel placed in the bath. The test solution was then charged to the vessel and the reaction carried out as set forth below. Vessel contents were mixed with a mechanical stirrer and by introducing a motive gas as indicated that also served to suspend the resin in the test solution. The motive gas was introduced by means of a sparger below the surface of the solution. An introduction rate was selected so as to maintain maximum agitation without expurgating test solution from the flask.

Test solution pH was maintained at the selected level using a ChemTrix 45 RR controller wherein controlled amounts of a 20 weight percent sulfuric acid solution were added as necessary.

In order to take measurements, solution with resin was poured into a fluted filter to effect separation of the solution and the resin. The iodide titrimetric method or the EPA titrimetric 410.1 method were used in testing the solution to obtain the data shown below. (Note: where the ammonium thiosulfate solution is shown below in ml/L units, the conversion factor multiplier is 0.494 to obtain grams of thiosulfate per liter of solution. For example, a 10 ml/L solution = 4.94 grams of thiosulfate per liter of solution.)

EXAMPLE 1

Comparison

Cuprous sulfide was selected as the catalyst for a factorial experiment. Tests were conducted to determine the effects on catalytic activity of varying the temperature and pH.

135 grams of cuprous sulfide were dispersed in 765 ml of a 10 ml/L aqueous ammonium thiosulfate solution which was vigorously agitated with air for 1 hour. Runs were conducted at different temperatures and pHs, 25° C. and 55° C., and 4 and 6, respectively. The results are shown in Table 1, below. The data indicates an optimum temperature and pH of 55° C. and 4, respectively, for the catalytic effect of the cuprous sulfide catalyst on the test solution thiosulfate concentration and COD.

TABLE 1

| Initial Concentration of Ammonium Thiosulfate = 10 ml/L | | | | | | |
|---|---|---|---|---|---|---|
| Reaction Temperature of: | Ammonium Thiosulfate Concentration (ml/L) at a pH of: | | Copper Ion Concentration (mg/L) at a pH of: | | COD (Mg/L) at a pH | |
| | 4 | 6 | 4 | 6 | 4 | 6 |
| initial | 10.0 | 10.0 | 0.0 | 0.0 | 3200 | 3200 |
| 25° C. | 2.0 | 3.0 | 710 | 650 | 570 | 1700 |
| 40° C. | 0.8 | 2.8 | 1200 | 450 | 520 | 900 |
| 55° C. | 0.6 | 1.4 | 1060 | 430 | 420 | 850 |

EXAMPLE 2

Amberlite IRA-68 resin with silver sulfide imbibed was tested as a catalyst. A 10 ml/L solution of ammonium thiosulfate was vigorously agitated with air at a flow rate of 16 cfh (125.9 cc/sec) in the presence of the catalyst for 1 hour at 55° C. while maintaining pH at 3. The IRA-68/$Ag_2S$ resin demonstrated good catalytic activity in decreasing thiosulfate concentration, as shown in Table 2, below, as compared with the control run with no resin present.

TABLE 2

| Catalysts | Ammonium Thiosulfate Concentration (ml/L) | pH | COD (mg/L) |
|---|---|---|---|
| Control (no resin) | 10.0 | 3 | 3200 |
| IRA68/$Ag_2S$ | 0.6 | 3 | 460 |

EXAMPLE 3

Tests were carried out on aqueous ammonium thiosulfate solutions of higher concentrations than in Example 2 using the Amberlite 68 resin with silver sulfide imbibed in which the initial ammonium thiosulfate concentration was increased to 100 ml/L. The air flow rate was 16 cfh (125.9 cc/sec). The temperature of the solution was 55° C. and the pH was 3. The reaction time was 5 hours using the IRA-68 resin containing silver sulfide. Thiosulfate concentration, COD and silver concentration decreased as measured at intervals of 1, 3 and 5 hours. The results are shown in Table 3 below.

TABLE 3

Initial Silver Concentration = 0 mg/L
Initial ammonium thiosulfate concentration = 100 ml/L
Initial COD = 39,000 mg/L
Catalyst: IRA68/Ag$_2$S

| Ammonium Thiosulfate Concentration (ml/L) | pH | COD (mg/L) | Reaction Time (Hr) | Silver Concentration (mg/L) |
|---|---|---|---|---|
| 23.6 | 3 | 11,000 | 1 | 31 |
| 6.4 | 3 | 4,000 | 3 | 8.8 |
| 0 | 3 | 2,600 | 5 | 1.6 |

EXAMPLE 4

Figure 1:
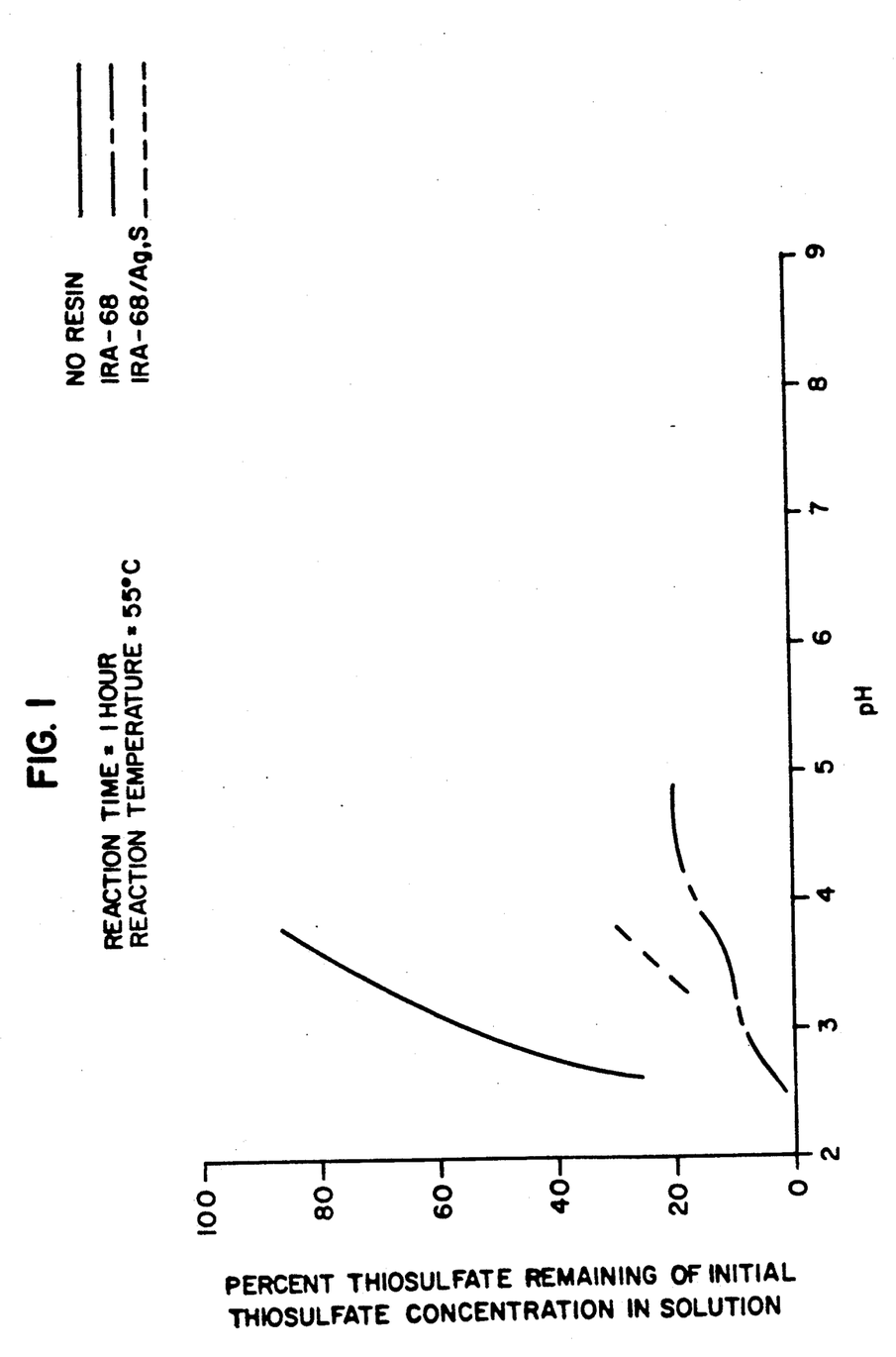
FIG. 1 is a graph plotting percentage thiosulfate remaining in desilvered x-ray fix solution after air agitation as a function of pH for a reaction time of 1 hour, for protonated anionic ion exchange resin (IRA-68) with and without silver sulfide, and for without resin.

Tests were run on a seasoned photographic process solution comprising a desilvered x-ray fixing solution containing about 195 ml/L thiosulfate and containing about 50–100 mg/L silver. Air agitation was carried out at a flow rate of 16 cfh (125.9 cc/sec) at 55° C. for 1 hour and the results charted for no catalyst, IRA-68 catalyst and IRA-68/Ag$_2$S catalyst. The percent of thiosulfate remaining was measured against solution pH. The results are shown in FIG. 1. The data indicate that while IRA-68 and IRA-68/Ag$_2$S catalyze the destruction of thiosulfate, pH also has the effect of improving results for the lower pH values shown.

EXAMPLE 5

Tests were run on a seasoned photographic bleach-fix solution as a representative seasoned film developer solution.

Figure 2:
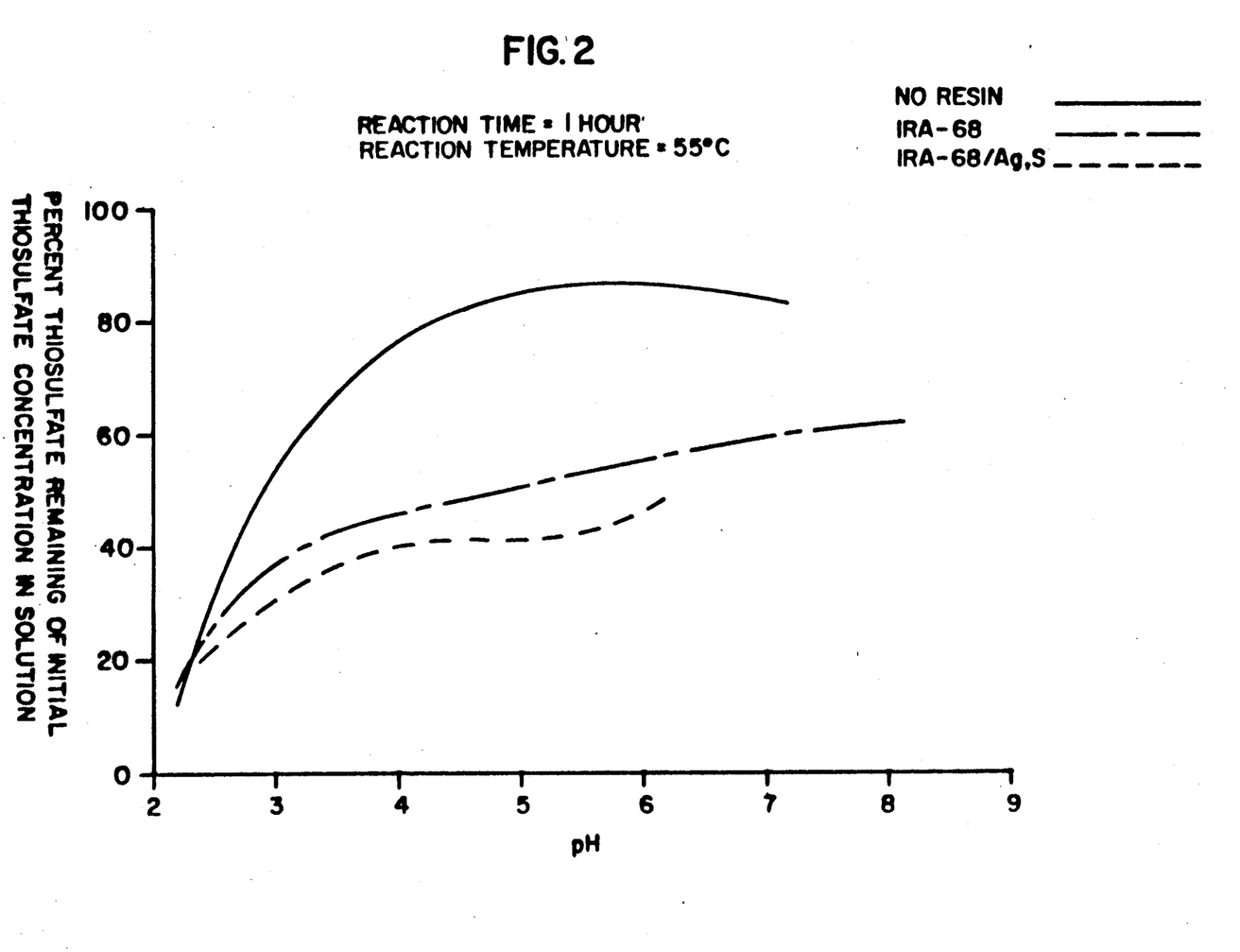
FIG. 2 is a similar graph to FIG. 1 but using a photographic bleach-fix solution.
Figure 3:
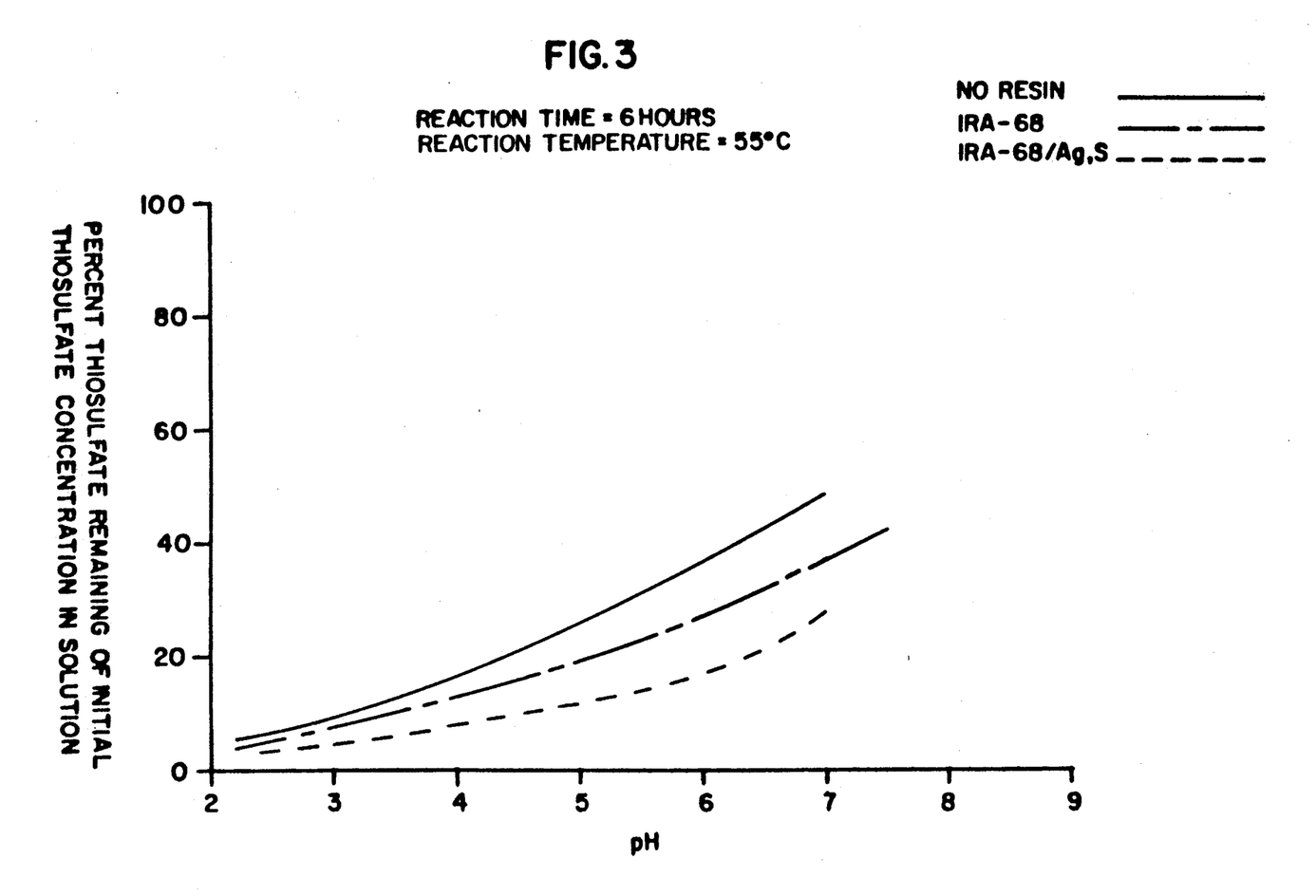
FIG. 3 is a similar graph to FIG. 2 at a reaction time of 6 hours.

Agitation with air at a flow rate of 16 cfh (125.9 cc/sec) was carried out for 1 hour at 55° C. with no catalyst, with IRA-68 resin catalyst and with IRA-68/Ag$_2$S catalyst to measure the effect of solution pH on the percent of thiosulfate remaining after air agitation and to determine whether the presence of bleach exhibits an inhibiting effect on the reaction. The data shown in FIG. 2 indicate that thiosulfate concentration decreases and that the bleach may inhibit catalytic activity when compared to a solution not containing bleach as seen in FIG. 1. Continued air agitation out to 6 hours as shown in FIG. 3 shows that greater than 90 percent of the thiosulfate was destroyed at a pH of 4 or less using the resin catalyst. The results also indicate that at a pH of about 2, the presence of the resin has a decreased effectiveness in lowering thiosulfate concentration but as seen in FIG. 6 it is effective in decreasing COD as compared with no resin present.

Figure 4:
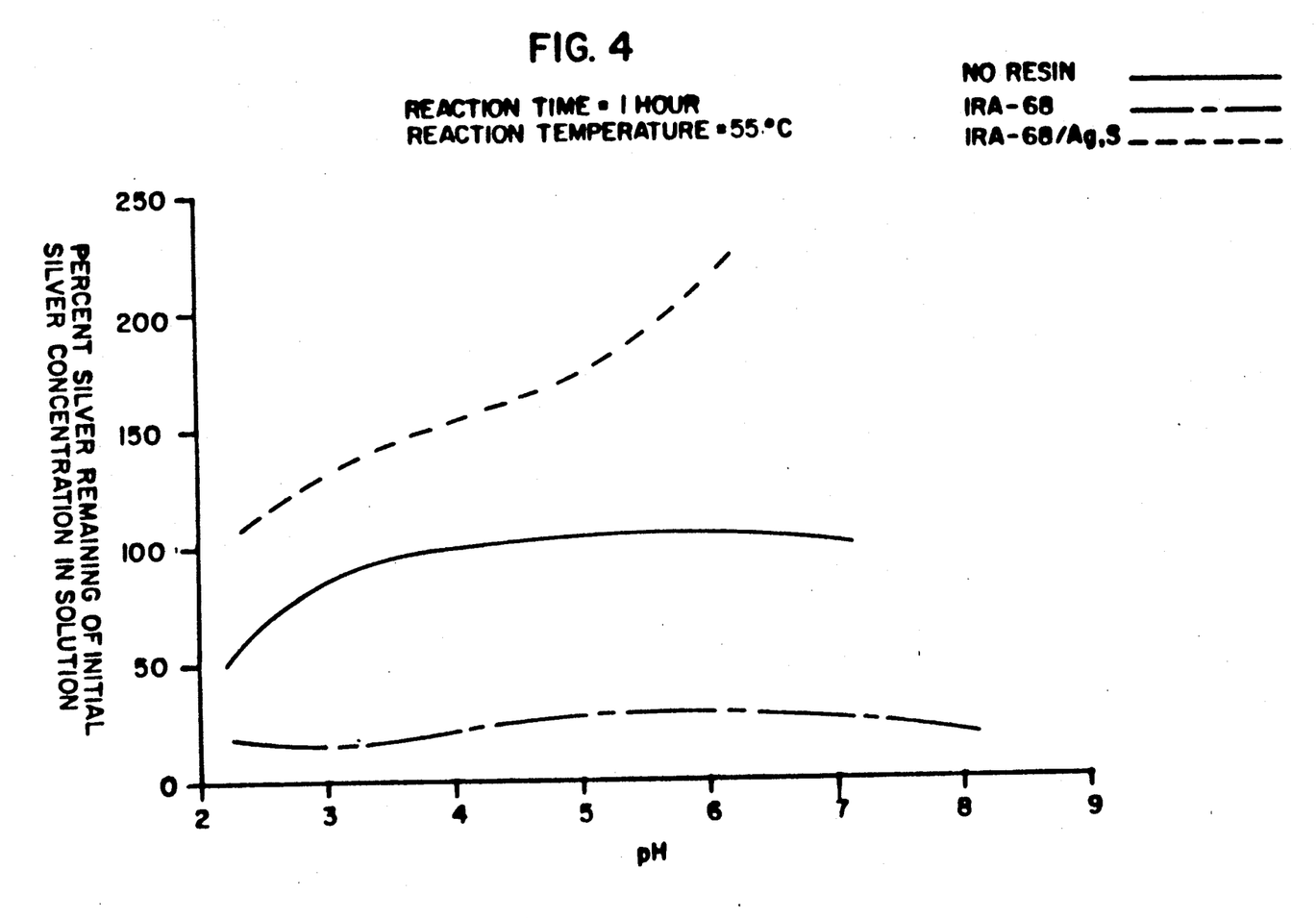
FIG. 4 is a similar graph to FIG. 2 showing percent silver remaining as a function of pH.
Figure 5:
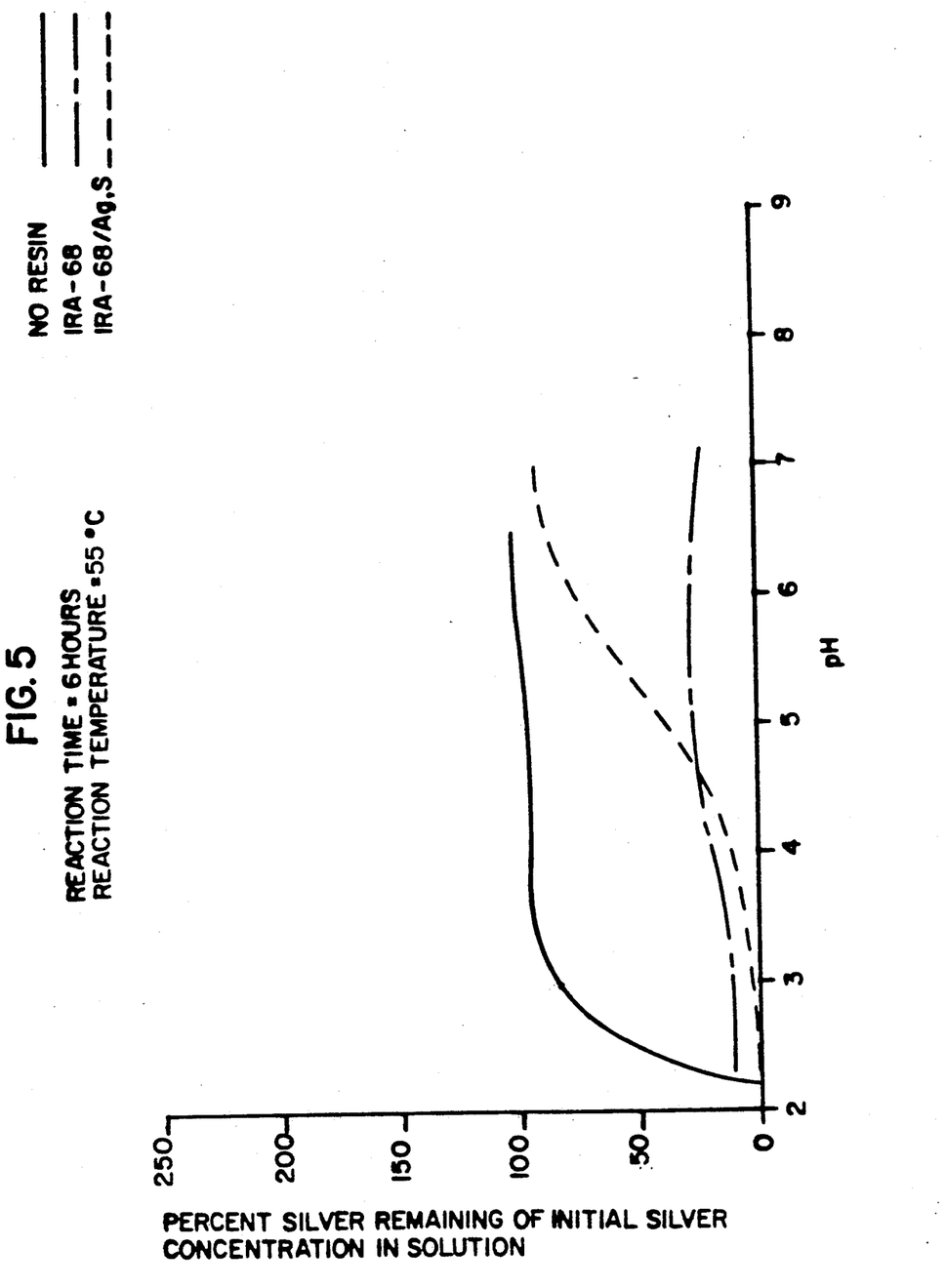
FIG. 5 is a similar graph to FIG. 3 showing percent silver remaining as a function of pH.

The pH effect on silver ion remaining in solution was measured as shown in FIG. 4. The results show that the IRA-68 resin catalyst at a pH of about 9 or less will imbibe silver and thus decrease the amount of dissolved silver. The IRA-68 resin/Ag$_2$S catalyst increases the amount of complexed silver in solution at the 1 hour reaction time but, as shown in FIG. 5, as air agitation time proceeds to 6 hours and the thiosulfate concentration decreases, the silver concentration decreases below that using the IRA-68 resin for a solution pH of less than about 4.7.

Figure 6:
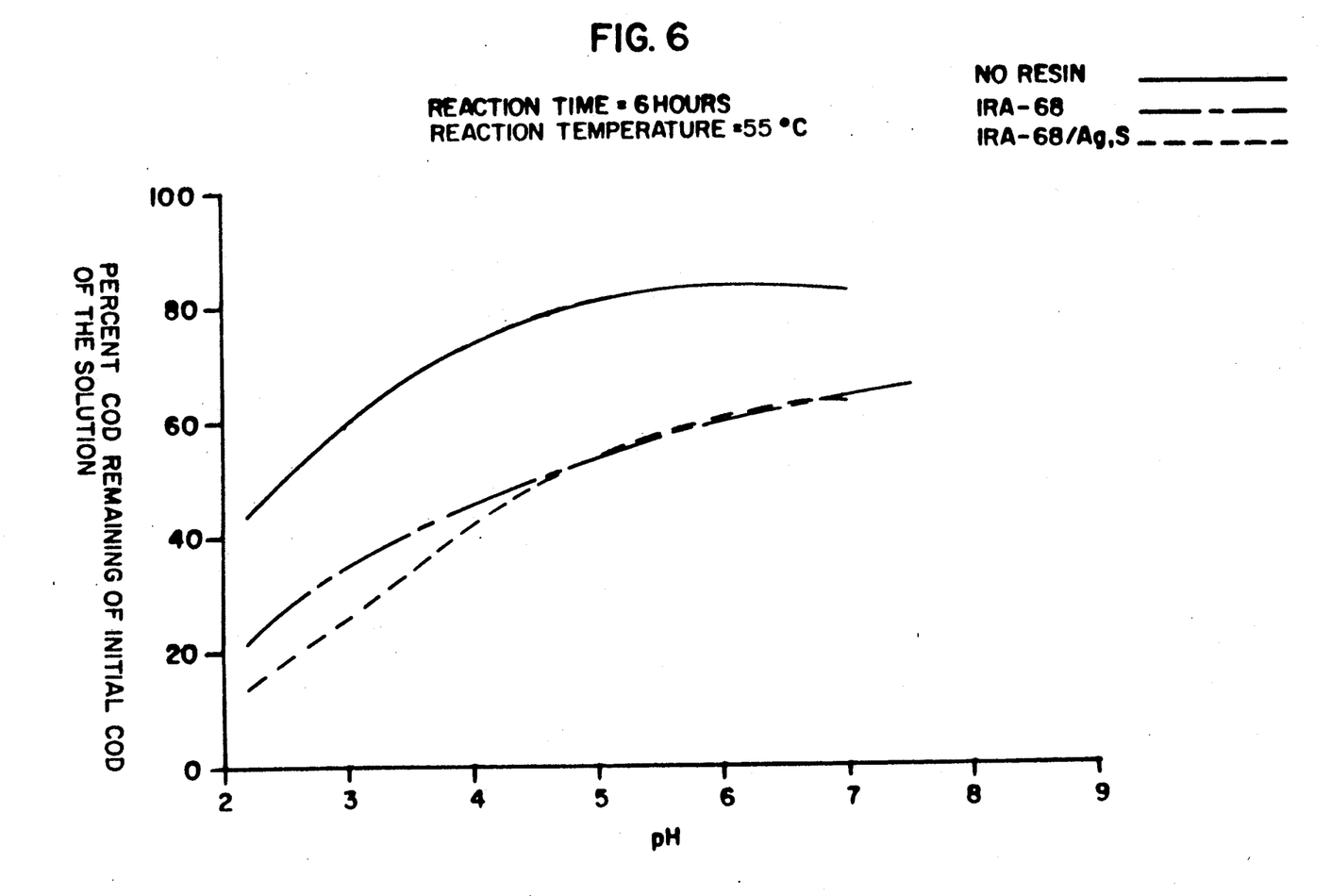
FIG. 6 is a similar graph to FIG. 3 showing COD reduction as a function of pH.

COD was similarly measured as a function of pH for an air agitation time of 6 hours as shown in FIG. 6. The percent drop in COD did not equal the percent decrease in thiosulfate concentration (FIG. 3). This may be due to the presence in the solution of the bleach which itself has a COD and is not removed as rapidly as thiosulfate.

The data does indicate that a 75 percent COD reduction is obtained after a 6 hour agitation time at a pH less than about 3 in the presence of either resin catalyst shown.

EXAMPLE 6

Tests were run to evaluate resin catalyst life with and without resin regeneration. The air flow rate was 16 cfh (125.9 cc/sec) and each run was for an air agitation time of one hour. A new ammonium thiosulfate solution with an initial concentration of 121.5 ml/L was used in each successive run. In the first study, IRA-68 resin was the catalyst and was initially acidified with sulfuric acid but not regenerated between runs. As shown in Table 4 below the catalyst lost some effectiveness in that thiosulfate destruction, COD reduction and Ag removal all decreased with each successive run.

TABLE 4

IRA68 Reuse Without Regeneration

| Run | Ammonium Thiosulfate Concentration (ml/L) | pH | COD (mg/L) | Silver (mg/L) |
|---|---|---|---|---|
| initial | 121.5 | 9.4 | 82000 | 110.0 |
| #1 | 12.8 | 3.5 | 34000 | 32.3 |
| #2 | 18.5 | 3.5 |  | 79.7 |
| #3 | 36.4 | 3.5 | 49000 | 100.0 |
| #4 | 37.4 | 3.5 |  | 200.0 |
| #5 | 45.9 | 3.5 | 51000 | 200.0 |

A second study was conducted the same as the first study with the exception that the IRA-68 resin was treated in-situ with a 20 percent sulfuric acid solution between successive runs. As shown in Table 5 below the resin maintained its effectiveness as a catalyst. Thiosulfate destruction, COD reduction and silver removal were all maintained.

TABLE 5

IRA68 Reuse with in Place Regeneration

| Run | Ammonium Thiosulfate Concentration (ml/L) | pH | COD (mg/L) | Silver (mg/L) |
|---|---|---|---|---|
| initial | 121.5 | 9.4 | 82000 | 110.0 |
| #1 | 15.0 | 3.1 | 29000 | 2.4 |
| #2 | 1.6 | 3.1 | 26000 | 0.2 |
| #3 | 5.1 | 3.1 | 28000 | 1.0 |
| #4 | 6.4 | 3.1 | 29000 | 0.6 |

A third study conducted the same as the first study except using an IRA-68/Ag$_2$S resin catalyst, and also without regeneration between runs, produced results similar to those of the first study. Table 6 below shows that thiosulfate destruction, COD reduction and Ag removal decreased with each successive run. Additionally, the silver content of the resin was measured before and after the runs and it was found that after 5 runs about 20 percent of the silver was removed from the resin. The silver was part of a gray precipitate generated during the runs and was found to be a mixture of silver sulfide and elemental sulfur. The precipitate can be recovered by filtration. When IRA-68 resin is the catalyst, the precipitate is white and was identified as substantially elemental sulfur.

TABLE 6

| | IRA68/Ag₂S Reuse Without Regeneration | | | |
|---|---|---|---|---|
| Run | Ammonium Thiosulfate Concentration (ml/L) | pH | COD (mg/L) | Silver (mg/L) |
| initial | 121.5 | 9.1 | 82000 | 110.0 |
| #1 | 8.3 | 3.2 | 37000 | 15.3 |
| #2 | 12.4 | 3.2 | | 33.1 |
| #3 | 16.9 | 3.2 | 44000 | 40.9 |
| #4 | 27.8 | 3.2 | | 60.0 |
| #5 | 22.0 | 3.2 | 49000 | 88.7 |

EXAMPLE 7

Tests were run on scrubbing sulfur dioxide that had accumulated during the air agitation process as described in the above examples from the test solution by running the discharge gases through a 2 percent sodium hydroxide solution. It was found that levels of sulfur dioxide removal were better than 99 percent as shown in Table 7 below. The pH of the scrubber solution showed little change while developing an amber color and generating more foam during an about 8 hour period of continuous use as in runs 3 and 4. A white precipitate that was substantially elemental sulfur settled from the scrubber solution over a period of about 4-8 hours upon standing.

TABLE 7

| | SO₂ Emissions Scrubbing | | | | |
|---|---|---|---|---|---|
| Run | SO₂ Inlet (ppm) | SO₂ Outlet (ppm) | % SO₂ Removed | Scrubber Solution pH | Time in Use (min) |
| 1 | 2,730 | 0.03 | 100 | 13.2 | 15 |
| 2 | 970 | 0.03 | 100 | 13.2 | 75 |
| 3 | 1,820 | 0.16 | 99.99 | 13.1 | 495 |
| 4 | 1,110 | 0.39 | 99.96 | 13.05 | 555 |
| 5 | 1,310 | 0.03 | 100 | 13.4 | 30 |
| 6 | 850 | 0.1 | 99.99 | 13.4 | 50 |

EXAMPLE 8

Tests were run on seasoned x-ray fix solutions using IRA-68 resin and starting with an initial concentration of sulfuric acid to fix solution of a 1:5 weight ratio for runs 1, 2, and 4, and 1:15 for runs 3 and 5. The pH was maintained at 3 for all 5 runs, and in runs 1-3 the motive gas was air and in runs 4 and 5 the motive gas was nitrogen. The tests were run in batch mode using a 1 hour reaction time and at a temperature of 56 degrees C. The ratio of resin to fix solution was 1 gram per 1.9 ml for all runs. Initial and final concentrations of sulfur oxyanions were measured and the results are as shown in Table 8, below.

The results show good destruction of sulfur oxyanions for both air and nitrogen as the motive gas. The results also show that destruction and not just ion exchange/sorption are taking place in that with the decrease in the final concentration of thiosulfate ion there is a corresponding increase in not just sulfate ($SO_4^=$) ion but also in elemental sulfur (S°) and other ions as shown.

TABLE 8

| | | Final Concentration (g/L) | | | | |
|---|---|---|---|---|---|---|
| Ion | Initial Concentration (g/L) | Run 1 (air = motive gas) | Run 2 (air = motive gas) | Run 3 (air = motive gas) | Run 4 (N2 = motive gas) | Run 5 (N2 = motive gas) |
| S° | 0 | 53.25 | 48.46 | 47.46 | 46.22 | 31.57 |
| SO₂ | 0 | 0.02 | 0.26 | 0.10 | 0.24 | 0.08 |
| SO₃= | 4.90 | 0.05 | 0.20 | 0.13 | 0.30 | 0.10 |
| SO₄= | 11.55 | 12.54 | 24.75 | 12.54 | 22.08 | 27.78 |
| S₂O₃= | 103.50 | 12.22 | 8.58 | 22.50 | 12.80 | 38.46 |
| S₂O₆= | 0.45 | 0.03 | 0.23 | 0.08 | 0.18 | 0.30 |
| S₃O₆= | 1.64 | 1.76 | 4.74 | 2.06 | 6.42 | 3.00 |
| S₄O₆= | 0 | 1.17 | 2.52 | 0.51 | 2.40 | 1.24 |
| S₅O₆= | 0 | 0 | 0.43 | 0.08 | 0.43 | 0.26 |

EXAMPLE 9

Tests were run as in Example 8 but without a resin catalyst for runs 1 and 2 and with a IRA-68 resin for runs 3-5. The initial weight ratio of sulfuric acid to fix solution was 1:5 for runs 1-4 and 1:15 for run 5. pH was maintained at 2.5 for run 1, 2.2 for run 2, and at 3 for runs 3-5. The motive gas was air for all runs. All runs were in the batch mode, for 1 hour, at a temperature of 56 degrees C., and with a ratio of resin to fix solution for runs 3-5 of 1 gram per 1.9 ml. The results are as shown in Table 9, below.

It can be seen that the relative final concentrations of elemental sulfur and sulfur dioxide to less destroyed oxyanions such as trithionate ($S_3O_6^=$) and tetrathionate ($S_4O_6^=$) is greater with resin present (runs 3-5) than without resin present (runs 1 and 2), showing the effectiveness of the resin in catalyzing the reactions.

TABLE 9

| | Initial Concentration (g/L) | Final Concentration (g/L) | | | | |
|---|---|---|---|---|---|---|
| Ion | | Run 1 | Run 2 | Run 3 | Run 4 | Run 5 |
| S° | 0 | 28.93 | 40.01 | 53.25 | 48.46 | 47.46 |
| SO₂ | 0 | 1.56 | 0.75 | 0.02 | 0.26 | 0.10 |
| SO₃= | 4.90 | 1.00 | 0.38 | 0.05 | 0.20 | 0.13 |
| SO₄= | 11.55 | 1.62 | 1.41 | 12.54 | 24.75 | 12.54 |
| S₂O₃= | 103.50 | 19.01 | 10.31 | 12.22 | 8.58 | 22.50 |
| S₂O₆= | 0.45 | 0.33 | 0.23 | 0.03 | 0.23 | 0.08 |
| S₃O₆= | 1.64 | 28.20 | 25.82 | 1.76 | 4.74 | 2.06 |
| S₄O₆= | 0 | 14.54 | 9.01 | 1.17 | 2.52 | 0.51 |
| S₅O₆= | 0 | 3.10 | 2.05 | 0 | 0.43 | 0.08 |

EXAMPLE 10

Tests were run on a photographic fix solution maintaining a pH of 5 by the addition of sulfuric acid and using IRA-68 resin in a ratio of 1 gram of resin to 1.9 ml of fix solution. Air was the motive gas for two runs and nitrogen was the motive gas for two runs. The four runs were in the batch mode for a one hour reaction time and at 56 degrees C. The results are as shown in Table 10, below. The results indicate that air and nitrogen are effective motive gases.

TABLE 10

| | | Final Concentration (g/L) | | | |
|---|---|---|---|---|---|
| Ion | Initial Concentration (g/L) | Run 1 (air = motive gas) 1/85 ml acid/ml fix | Run 2 (air = motive gas) 1/145 ml acid/ml fix | Run 3 (N2 = motive gas) 1/125 ml acid/ml fix | Run 4 (N2 = motive gas) 1/85 ml acid/ml fix |
| S° | 0 | 26.22 | 28.64 | 21.67 | 25.27 |

TABLE 10-continued

| | | Final Concentration (g/L) | | | |
|---|---|---|---|---|---|
| | | Run 1 (air = motive gas 1/85 ml acid/ ml fix) | Run 2 (air = motive gas 1/145 ml acid/ ml fix) | Run 3 (N2 = motive gas 1/125 ml acid/ ml fix) | Run 4 (N2 = motive gas 1/85 ml acid/ ml fix) |
| Ion | Initial Concentration (g/L) | | | | |
| $SO_2$ | 0 | 0 | 0 | 0 | 0 |
| $SO_3^=$ | 4.90 | 2.38 | 1.88 | 2.60 | 2.40 |
| $SO_4^=$ | 11.55 | 28.35 | 26.52 | 30.90 | 29.76 |
| $S_2O_3^=$ | 103.50 | 57.33 | 48.00 | 55.02 | 52.27 |
| $S_2O_6^=$ | 0.45 | 0.15 | 0.13 | 0.15 | 0.13 |
| $S_3O_6^=$ | 1.64 | 0.28 | 0.56 | 0.30 | 0.34 |
| $S_4O_6^=$ | 0 | 0 | 0 | 0 | 0 |
| $S_5O_6^=$ | 0 | 0 | 0 | 0 | 0 |

EXAMPLE 11

Tests were run on a photographic fix solution with air as the motive gas, without resin and maintaining a pH of 3 (runs 1 and 2), and with resin and maintaining a pH of 5 (runs 3 and 4). The runs were in the batch mode, for a 1 hour reaction time, at 56 degrees C., and for runs 3 and 4 with the ratio of IRA-68 resin to fix solution of 1 gram per 1.9 ml. The results are as shown in Table 11, below. They show that with resin present sulfur oxyanions are destroyed and to a greater extent than without resin present at the indicated pHs, for example as is seen with respect to the final concentrations of $S_2O_3$, trithionate and tetrathionate.

TABLE 11

| | | Final Concentration (g/L) | | | |
|---|---|---|---|---|---|
| | | Run 1 (pH 3 1/55 ml acid/ ml fix no resin) | Run 2 (pH 3 1/55 ml acid/ ml fix no resin) | Run 3 (pH 5 1/85 ml acid/ ml fix resin) | Run 4 (pH 5 1/145 ml acid/ ml fix resin) |
| Ion | Initial Concentration (g/L) | | | | |
| S° | 0 | 4.70 | 4.01 | 26.22 | 28.64 |
| $SO_2$ | 0 | 0.26 | 0.20 | 0 | 0 |
| $SO_3^=$ | 4.90 | 0.18 | 0.13 | 2.28 | 1.88 |
| $SO_4^=$ | 11.55 | 4.65 | 4.29 | 28.35 | 26.52 |
| $S_2O_3^=$ | 103.50 | 93.82 | 92.80 | 57.33 | 48.00 |
| $S_2O_6^=$ | 0.45 | 0.45 | 0.60 | 0.15 | 0.13 |
| $S_3O_6^=$ | 1.64 | 7.58 | 8.58 | 0.28 | 0.56 |
| $S_4O_6^=$ | 0 | 2.57 | 3.05 | 0 | 0 |
| $S_5O_6^=$ | 0 | 0.70 | 0.80 | 0 | 0 |

The present invention can be advantageously employed in any waste water treatment process in which it is desired to destroy sulfur oxyanions. It provides significant benefits. For example, maximum agitation in the presence of the catalysts described above is economical and can effectively destroy sulfur oxyanions. The invention can also be effectively employed to destroy sulfur oxyanions present in high concentrations such as are present in photographic processing solutions. The invention is also of particular benefit in destroying sulfur oxyanions in waste streams and in decreasing silver ion concentration if also present in solution.

Although the resin catalysts of the present invention are organic, acidic inorganic catalysts such as Bronsted acids or Bronsted-Lewis acids such as silica-aluminum oxide should also work in the practice of the invention.

This invention has been described above with particular reference to preferred embodiments. A skilled practitioner familiar with the detailed description above, can make many substitutions and modifications without departing from the scope and spirit of the appended claims.

We claim:

1. A method for the destruction of a sulfur oxyanion in an aqueous solution containing inert cations, said sulfur oxyanion being selected from the group consisting of $SO_3^=$, $S_2O_3^=$, $S_2O_6^=$, and $S_3O_6^=$, said method comprising:

contacting a catalytic quantity of a protonated anion ion exchange resin having silver sulfide imbibed therein with said aqueous solution containing said sulfur oxyanion while maintaining the pH of said solution at a pH below about 8, whereby said sulfur oxyanion is reduced to elemental sulfur.

2. The method of claim 1 wherein said anion ion exchange resin is selected from the group consisting of (i)polyvinyl pyridine, (ii) phenol formaldehyde polymeric resins having the repeating unit wherein m has a value from 2 to about 4, and (iii) resins having the formula

P-X-P wherein P is a polymeric unit selected from the class consisting of epoxy, acrylic, and styrene, and X is a linking group selected from the class consisting of wherein R is a straight chain alkyl group having from 2 up to about 8 carbon atoms, wherein T is a straight chain alkyl group having from 2 up to about 8 carbon atoms, and and having at least one basic group attached to said polymeric unit P, said basic group being selected from groups having the formula and wherein z has a value of 0 or 1, m has a value from 0 to about 3, q has a value from 1 to about 3, and when z has a value of 1, n has a value from 2 to about 7, and when z has a value of 0, n has a value from 1 to about 7.

3. The method of claim 1 wherein said resin is suspended in said solution.

4. The method of claim 3 wherein said resin is maintained in suspension by introducing a stream of a motive gas into said suspension.

5. The method of claim 1 wherein said sulfur oxyanion is thiosulfate.

6. The method of claim 5 wherein said thiosulfate-containing solution is a used fix solution employed in photoprocessing of a silver halide-based photographic element.

7. The method of claim 5 wherein said thiosulfate-containing solution is a used bleach-fix solution employed in photoprocessing of a silver-halide photographic element.

8. The method of claim 7 wherein said used bleach-fix solution contains ammonium thiosulfate, sodium bisulfite, and an ammonium salt of the ferric complex of ethylenediaminetetraacetic acid.

9. The method of claim 1 wherein said pH is maintained below about 3.

10. The method of claim 1 wherein said pH is maintained by automatic chemical addition means responsive to a fluctuation of said pH outside of a predetermined operating range whereby a chemical is automatically added to said aqueous solution to return said pH to said predetermined operating range.

11. The method of claim 1 wherein said sulfur oxyanion is present in said aqueous solution in a concentration of from about 5 grams per liter of solution to about 100 grams per liter of solution.

12. The method of claim 1, further comprising the step of regenerating said resin by contacting said resin with an acid.

13. The method of claim 1 wherein said resin is an acrylic based resin.

14. The method of claim 1 wherein said resin is a styrene based resin.

15. The method of claim 1 wherein said resin is polyvinyl pyridine.

16. The method of claim 1 wherein said resin is a phenol formaldehyde polymeric resin having the repeating unit wherein m has a value from 2 to about 4.

17. The method of claim 1 wherein said resin is a weakly basic anion ion exchange gel resin having an acrylic backbone, crosslinked with divinyl benzene, and having a tertiary amine functional group.

* * * * *